(12) United States Patent
Benson, Jr.

(10) Patent No.: US 6,546,045 B1
(45) Date of Patent: Apr. 8, 2003

(54) METHOD FOR COMMUNICATION USING ADAPTIVE MODEM

(75) Inventor: Robert A. Benson, Jr., Saunderstown, RI (US)

(73) Assignee: United States of America, Washington, DC (US)

( * ) Notice: Subject to any disclaimer, the term of this patent is extended or adjusted under 35 U.S.C. 154(b) by 0 days.

(21) Appl. No.: 09/443,242

(22) Filed: Nov. 16, 1999

(51) Int. Cl.$^7$ ................................................ H04B 1/38
(52) U.S. Cl. ...................................................... 375/222
(58) Field of Search ................................. 375/222, 218; 367/132, 134, 3

(56) References Cited

U.S. PATENT DOCUMENTS

| | | | | |
|---|---|---|---|---|
| 5,048,054 A | * | 9/1991 | Eyuboglu et al. | 375/222 |
| 5,987,061 A | * | 11/1999 | Chen | 375/222 |
| 6,374,375 B1 | * | 4/2002 | Yip et al. | 375/231 |

\* cited by examiner

Primary Examiner—Don N. Vo
(74) Attorney, Agent, or Firm—James M. Kasischke; Michael F. Oglo; Jean-Paul Nasser

(57) ABSTRACT

A method to improve communication system performance using an adaptive modem that estimates the communication channel scattering function to select one of several modulation schemes. The scattering function is estimated from the channel's frequency (doppler) and time (multipath) spreading effects on a probe signal. The probe signal is transmitted from a first modem to a second modem. The second modem processes the channel measurements and transmits the channel spreading factors to the first modem. Based upon the channel scattering function estimate, channel characteristic data, propagation models, strategic information, and modem position estimates, the first modem selects one of several modulation schemes. Subsequent data transmissions from the first modem to the second modem contain a modulation mode identifier. The second modem uses the modulation mode identifier to select the correct demodulation scheme. Upon the occurrence of predetermined criteria, the channel scattering function estimate may be updated and a new modulation scheme selected to continue transmission. Each modem is equipped with the probe signal to allow bi-directional channel characterization.

18 Claims, 2 Drawing Sheets

METHOD FOR COMMUNICATION USING ADAPTIVE MODEM

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

This patent application is co-pending with a related patent application Ser. No. 09/443,241 by the same inventor as this patent application.

BACKGROUND OF THE INVENTION (1) Field of the Invention

The present invention relates generally to communication systems, and more particularly to a method for using an adaptive modem that selects modulation and signal processing schemes to minimize detection, demodulation, and decoding errors while maximizing transmission data rates.

(2) Description of the Prior Art

Doppler and multipath are two well-known effects presented by communication channels. The doppler effect is characterized by an alteration of the transmitted signal frequency when there is relative movement between the transmitter and receiver. Alternately, multipath describes the multiple and time-delayed received signals resulting from a single transmission that travels multiple and varying length paths between the transmitter and receiver. U.S. Pat. No. 5,301,167 to Proakis et al. describes the ocean acoustic channel behavior and the resulting variant multipath that must be recognized as a basic channel characteristic. Proakis et al. describe an underwater acoustic communications apparatus using doppler removal, a specialized sample timing control technique, and decision feedback equalization to achieve high data rates for phase coherent modulation and demodulation. Proakis et al. present an apparatus in which digitized data streams are preceded by a synchronization signal and training sequence that are Phase-Shift-Keyed (PSK) modulated. This technique, although more efficient than other Frequency-Shift-Keying (FSK) techniques, provides a single transmit modulation and receive demodulation scheme regardless of channel characteristics. Experimentation with the FSK technique indicates communication difficulties even with a relatively high signal-to-noise ratio (SNR).

There is currently no method that measures the channel's time and frequency characteristics to adapt the transmission modulation scheme.

What is needed is a method that actively measures the communication channel multipath and doppler characteristics, and uses such multipath and doppler measurements to determine communication system modulation and demodulation schemes.

SUMMARY OF THE INVENTION

It is a general purpose and object of the present invention to improve communication system error and transmission data rates. It is another object of the present invention to provide such improvement through a method that utilizes adaptive modems to measure the communication channel's doppler and multipath characteristics. A further object is to estimate the communication channel's scattering function using the doppler and multipath measurements and modem position estimates. Still another object of the present invention is to utilize such communication channel scattering function, together with channel characteristic data, strategic information, and propagation models, to select one of multiple modulation schemes for the communication scenario.

Other objects and advantages of the present invention will become more obvious hereinafter in the specification and drawings.

These objects are accomplished with the present invention by a method that utilizes an adaptive modem to estimate the communication channel scattering function and select one of multiple modulation schemes. The scattering function is derived from measurements of the channel's frequency (doppler) and time (multipath) spreading characteristics. The communication channel's doppler and multipath are measured by a channel probe signal that is transmitted from a first modem to a second modem. The second modem processes the received channel probe signal and transmits the channel spreading factors to the first modem. The first modem combines the channel spreading factors and modem position estimates to estimate the channel scattering function. The first modem uses the channel scattering function estimate, channel characteristic data, strategic information, and propagation models to select the optimum available modulation scheme, each modulation scheme comprised of a modulation technique and encoder. Subsequent data transmissions from the first modem to the second modem contain data modulated by the selected modulation scheme and coded with a modulation mode identifier. The second modem uses the modulation mode identifier to select a demodulation scheme comprising a demodulation and decoder pairing. Upon the occurrence of predetermined criteria, the channel scattering function estimate may be updated and a new modulation scheme may be selected to continue transmission. Because each modem is equipped with the probe signal, bi-directional channel characterization can be performed.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
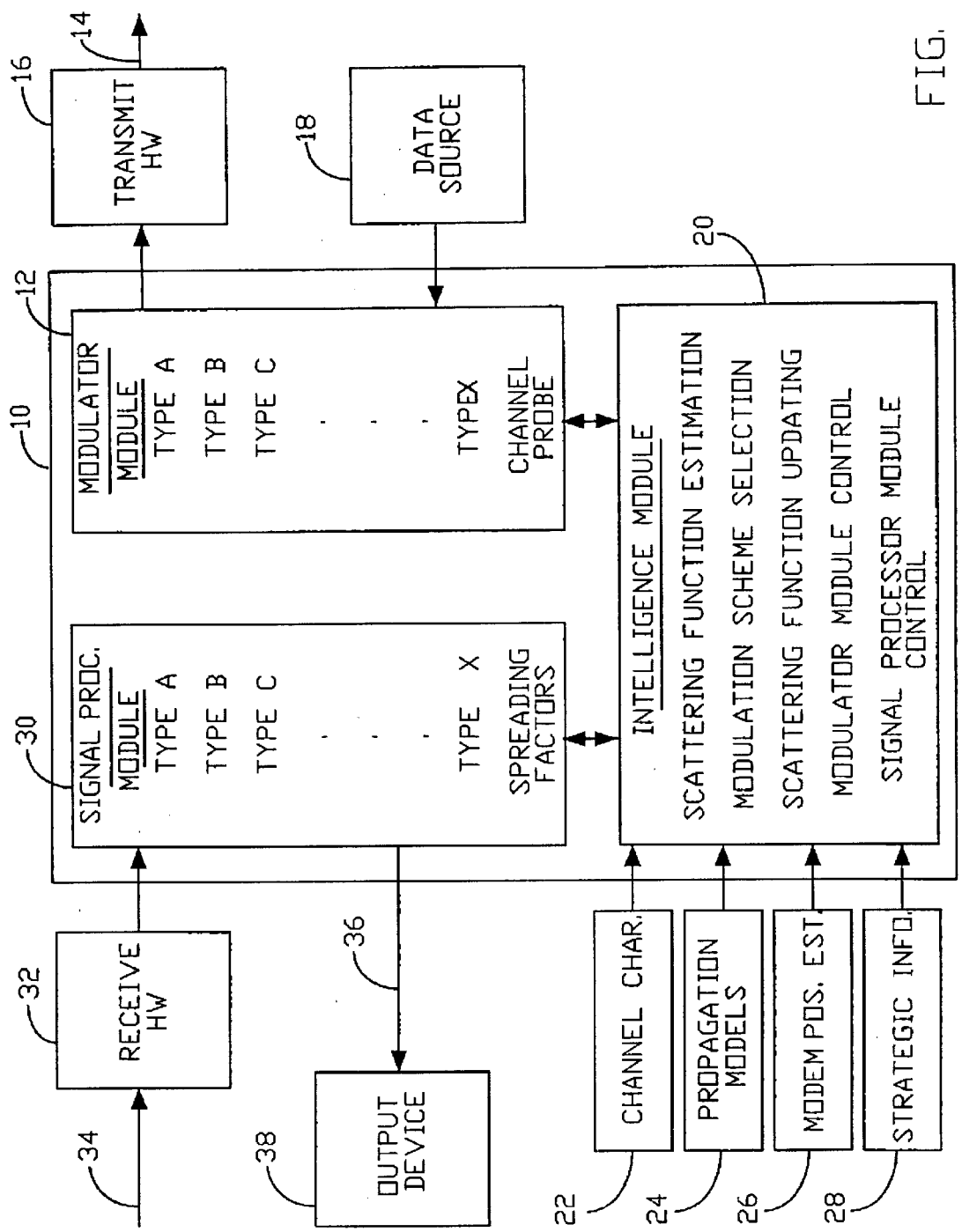
FIG. 1 is a block diagram of the adaptive modem paradigm.

Referring now to FIG. 1, there is shown a block diagram of the adaptive modem paradigm 10. Each modem contains modules for transmitting and receiving, and adaptive modem modules shall be described while referring to FIG. 1 as though the FIG. 1 modem is performing both transmit and receive functions.

Each modem contains a modulator module 12 capable of multiple modulation schemes. A modulation scheme is comprised of a modulation technique and an encoder. Adaptive modem therefore comprises either multiple modulation techniques paired with at least one encoder, or at least one modulation technique paired with multiple encoders. Examples of modulation techniques include Frequency Shift Keying (FSK) and Phase Shift Keying (PSK). The maximum number of modulation schemes contained within modulator module 12 is equal to the number of different pairings of modulation techniques with encoders, or the number of modulation techniques multiplied by the number of encoders. Referring to FIG. 1, the modulation schemes are designated "Type A", "Type B", etc., to "Type X". Modulator module 12 must also be capable of selecting the channel probe signal. Modulator module 12 provides the encoded, modulated signal to external hardware 14 for transmission 16.

Modulator module 12 receives the data to be encoded, modulated, and transmitted from a modem external data source 18. Data source 18 may provide voice, text, image, or any other data type compatible with modem requirements. Modulator module 12 encodes and modulates data before transferring data to the transmission hardware 14. Additionally, modulator module 12 codes the encoded, modulated data with a modulation mode identifier to indicate the modulation scheme.

Modulator module 12 maintains modem internal input and output communications with the modem's intelligence module 20. Intelligence module 20 estimates the channel's scattering function and determines the modulation scheme to be used by modulator module 12. Intelligence module 20 additionally determines when modulator module 12 selects the channel probe signal. In the preferred embodiment, channel probing occurs prior to data transmission, and at subsequent intervals that may be fixed or based upon transmission error rate, signal-to-noise ratio, or other predefined criteria. Intelligence module 20 therefore provides modulator module 12 with modulation scheme, channel probe selection, and modulator module 12 initialization data. Alternately, modulator module 12 provides intelligence 14 module 20 with current modulation scheme and modulator module 12 status data.

Intelligence module 20 estimates the channel scattering function using modem external inputs including channel characteristic data 22, propagation models 24, source and receiver position estimates 26, and strategic information 28. Channel characteristic data 22 includes any information characterizing the channel, and examples include oceanographic data or atmospheric data. Strategic information 28 is a general term for data regarding the goals or objectives for the transmission. Examples of strategic information 28 include the criteria for updating the scattering function (i.e., re-transmit the probe signal), desired SNR values or error rates before changing modulation schemes, limitations on specific modulation schemes, etc. The most significant component to intelligence module's 20 channel scattering function estimation is the modem internal input from a signal processor module 30 that contains the channel spreading factors. Signal processor module 30 derives the channel spreading factors from the received channel probe signal characteristics.

The modem internal interface between intelligence module 20 and signal processor module 30 is similar to that between intelligence module 20 and modulator module 12. Intelligence module 20 provides signal processor module 30 with signal processor module 30 initialization requirements. Signal processor module 30 provides intelligence module 20 with signal processor module 30 mode and status. Channel spreading factors computed by signal processor module 30 upon receipt of the channel probe signal are also communicated to intelligence module 20.

Signal processor module 30 is also responsible for interfacing with the receive hardware 32 that accepts the received signal 34, identifying the modulation scheme, selecting the corresponding demodulation scheme, and performing all demodulation and decoding functionality to reduce the data to its original form (i.e., voice, text, imagery, etc.). For each modulator module 12 modulation technique, signal processor module 30 maintains a corresponding demodulator technique. Similarly, for each modulator module 12 encoder, signal processor module 30 contains the decoder. Signal processor module 30 demodulation schemes comprise combinations of demodulation techniques and decoders, thereby producing a unique correspondence between modulator module 12 modulation schemes and signal processor module 30 demodulation schemes. Accordingly, signal processor module 30 demodulation schemes are designated in FIG. 1 as "Type A", "Type B", etc., to "Type X", just as modulator module 12 modulation schemes are designated. Signal processor module 30 uses the modulation mode identifier provided by modulator module 12 to select the correct demodulation scheme. Signal processor module 30 maintains a modem external interface 36 to transfer the demodulated, decoded data to the output device 38.

Figure 2:
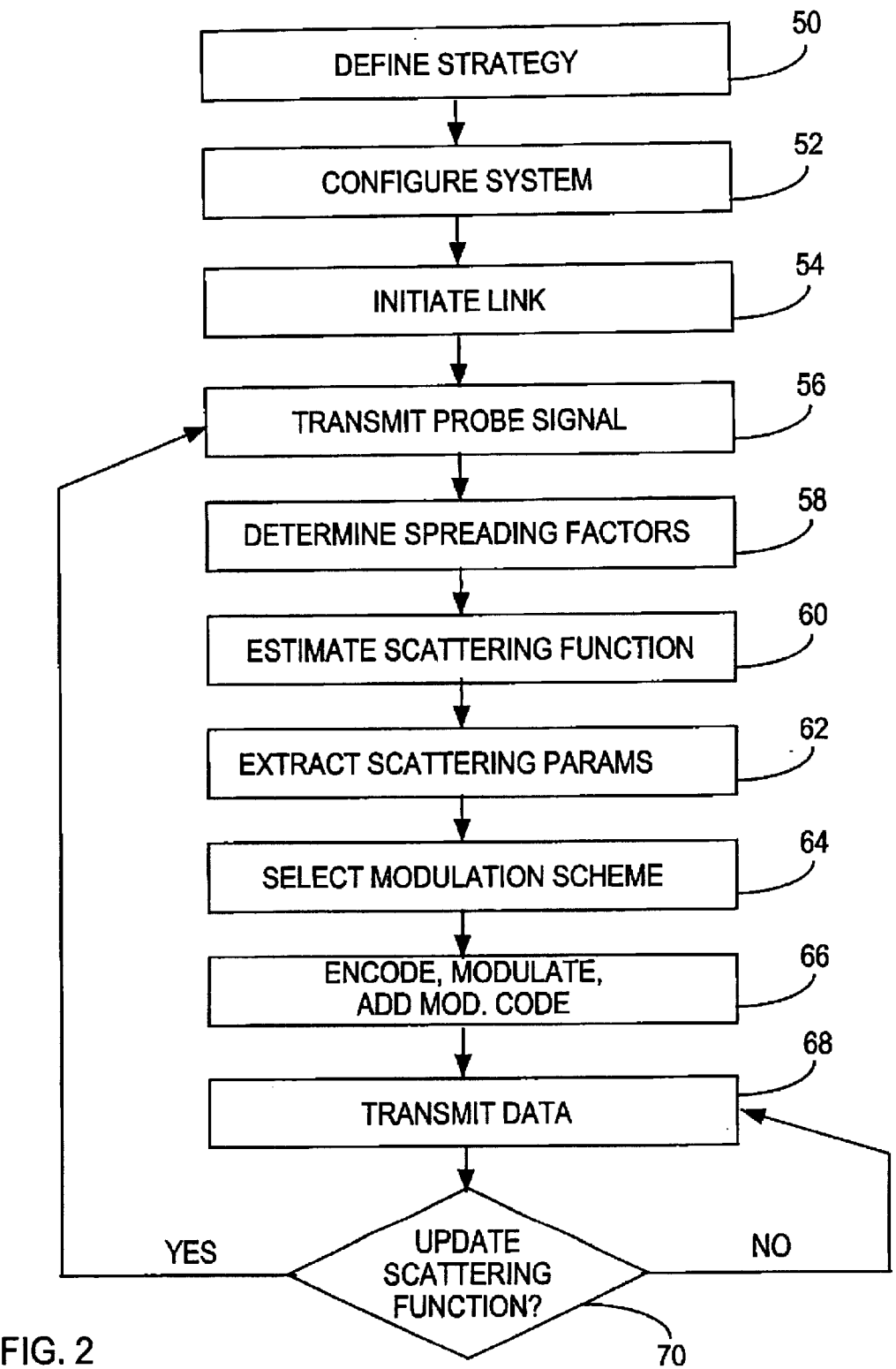
FIG. 2 is a block diagram of a communication system design using the adaptive modem.

Referring now to FIG. 2, there is shown a block diagram of the basic modem operation. The first step is to define a communication system strategy 50. The strategy includes modem configuration (initial modem locations; one transmit/one receive; one transmit/multiple receive, etc.), data transmission rates, performance measures (e.g., criteria to update the scattering function), available modulation techniques and encoders (i.e., modulation schemes), etc. Once the modems are configured 52 according to the strategy 50, a link 54 is established between a transmit modem and a receive modem. In the preferred embodiment, a transmit modem transmits to a distinct, identically configured receive modem, and for simplification, FIG. 2 shall be referenced for both transmit and receive functionality. FIG. 2 may therefore be extended to various configurations utilizing two or more modems. The transmit modem shall hereinafter be referred to as the first modem, and the receive modem shall be known as the second modem.

Once the link between first and second modem is established 54, first modem transmits the probe signal 56 to second modem. In the preferred embodiment, second modem's signal processing module determines the spreading factors 58 from the received probe signal, and passes the spreading factors to the intelligence module. The intelligence module estimates the channel scattering function 60 and extracts the scattering parameters 62 for transmission to first modem. First modem receives the scattering function parameters and first modem's intelligence module determines the modulation scheme 64 using the channel scattering function, channel characteristic data, strategic information, propagation models, and modem position estimates. First modem's modulator module encodes and modulates the data to be transmitted according to the selected modulation scheme, and codes the data with a modulation mode identifier 66 that indicates the modulation scheme. The coded modulated data is transmitted 68 and transmission continues until first modem's intelligence module issues a command to update the scattering function 70, whereupon, in the preferred embodiment, the probe signal is transmitted 56 to update the scattering function estimate. Once the scattering function is estimated with the update 60, 62, a modulation scheme is again selected 66, and data transmission 68 continues with the new modulation scheme.

In the preferred embodiment, all modems maintain the same structure, and therefore any modem may be configured to transmit or receive data. The channel scattering function may thus be estimated bidirectionally by transmitting the probe signal from both transmit and receive modems.

What has thus been described is a method to improve communication system performance using an adaptive modem that estimates the communication channel scattering function to select one of several modulation schemes comprised of a modulation technique and encoder. The scattering function is estimated from the channel's frequency (doppler) and time (multipath) spreading effects on a probe signal. The probe signal is transmitted from a first modem to a second modem. The second modem processes the channel measurements and transmits the channel spreading factors to the first modem. Based upon the channel scattering function estimate, channel characteristic data, propagation models, strategic information, and modem position estimates, the first modem selects one of several modulation schemes. Subsequent data transmissions from the first modem to the second modem contain a modulation mode identifier. The second modem uses the modulation mode identifier to select the correct demodulation scheme. Demodulation schemes correspond to modulation schemes, and are comprised of a demodulator and decoder. Upon the occurrence of predetermined criteria, the channel scattering function estimate may be updated and a new modulation scheme selected to continue transmission. Each modem is equipped with the probe signal to allow bi-directional channel characterization.

Although the present invention has been described relative to a specific embodiment thereof, it is not so limited. Obviously many modifications and variations of the present invention may become apparent in light of the above teachings. For example, the criteria to update the scattering function estimate (i.e., re-transmit the probe signal) may be fixed or performance-based (e.g., SNR, error rate, etc.), and selection of a modulation scheme may be based upon criteria other than a channel scattering function. Embodiments utilizing the channel function estimation could include continual scattering function updating and modulation selection to eliminate multiple probe signal transmissions. The data transmission can be coherent or noncoherent. Probe signal characteristics may vary depending upon the communication channel to maximize the channel effects on the probe signal. The available modulation/demodulation techniques may be one providing the number of encoders/decoders is greater than one. Functionality may be otherwise divided amongst the modems, for example, allowing the receive modem to process the probe signal, generate the scattering function, select the modulation/demodulation technique, and then transmit merely the modulation technique to the transmit modem. Alternately, the receive modem could determine when the scattering function should be updated. Various means of identifying the modulation scheme (modulation mode identifier) may be used. Although the preferred embodiment presented strategic information, propagation models, and channel characteristic data as external modem inputs, this information is not so limited and could reside within the modem. The channel could be the ocean, atmosphere, or other channel. The preferred embodiment contained a signal processor module capable of multiple demodulation techniques, however the signal processor module could comprise multiple signal processors.

Many additional changes in the details, materials, steps and arrangement of parts, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for communicating data through a channel using at least two modems, comprising:
   identifying a first modem having at least two modulation schemes, said at least two modulation schemes comprising one of at least two modulation techniques and one of at least one encoder;
   identifying a distinct second modem having at least two demodulation schemes, said at least two demodulation schemes comprising one of at least two demodulation techniques and one of at least one decoder, said at least two demodulation techniques corresponding to said at least two modulation techniques, said at least one decoder corresponding to said at least one encoder, such that said at least two demodulation schemes correspond to said at least two modulation schemes;
   establishing a link between said first modem and said second modem;
   transmitting a channel probe signal from said first modem to said second modem;
   said second modem receiving said channel probe signal;
   processing said received channel probe signal;
   selecting one of said first modem said at least two modulation schemes using said processed channel probe signal;
   said first modem modulating said data using said selected one of at least two modulation schemes;
   said first modem transmitting said modulated data;
   said second modem receiving said modulated data;
   said second modem demodulating said data using said one of at least two demodulation schemes, said one of at least two demodulation schemes corresponding to said selected one of at least two modulation schemes;
   said processing said received channel probe signal comprising:
      determining multipath spreading characteristics of said channel probe signal;
      determining Doppler frequency spreading characteristics of said channel probe signal; and
      generating a channel scatter function estimate using said processed received channel probe signal.

2. The method of claim 1 wherein selecting one of said first modem said at least two modulation schemes comprises:
   accepting modem extrinsic data further comprising channel characteristic data, propagation model data, modem position estimates, and strategic information; and
   combining said channel scattering function estimate with said modem extrinsic data to select one of said at least two modulation schemes.

3. The method of claim 1 further comprising updating said channel scattering function estimate upon predetermined criteria.

4. The method of claim 3 wherein updating said channel scattering function estimate upon predetermined criteria further comprises:
   establishing said predetermined criteria;
   determining said predetermined criteria is satisfied;
   transmitting said channel probe signal from said first modem to said second modem;
   receiving said channel probe signal at said second modem;
   determining time spreading characteristics of said channel probe signal;
   determining frequency spreading characteristics of said channel probe signal;
   deriving an updated channel scattering function estimate using said time spreading and said frequency spreading characteristics of said channel probe signal;
   determining an updated one of at least two modulation schemes using said updated channel scattering function estimate; and
   modulating said data using said updated one of at least two modulation schemes.

5. The method of claim 1 further comprising:
   said first modem coding said modulated data to indicate said selected one of at least two modulation schemes; and said second modem decoding said modulated data to select said one of at least two demodulation schemes, said selected one of at least two demodulation schemes corresponding to said selected one of at least two modulation schemes.

6. The method of claim 1 further comprising:

said second modem transmitting a distinct second channel probe signal to said first modem;

said first modem receiving said distinct second channel probe signal; and processing said received distinct second channel probe signal.

7. The method of claim 6 wherein processing said received distinct second channel probe signal further comprises:

determining time spreading characteristics of said received distinct second channel probe signal;

determining frequency spreading characteristics of said received distinct second channel probe signal; and generating a channel scattering estimate between said second modem and said first modem using said time spreading and said frequency spreading characteristics of said received distinct second channel probe signal.

8. The method of claim 7 wherein generating said channel scattering function estimate between said second modem and said first modem further comprises:

accepting modem extrinsic data further comprising channel characteristic data, propagation model data, modem position estimates, and strategic information; and combining said modem extrinsic data and said time spreading and said frequency spreading characteristics of said channel probe signal to estimate said channel scattering function.

9. A method for communicating data through a channel using at least two modems, comprising:

identifying a first modem having at least two modulation schemes, said at least two modulation schemes comprising one of at least two modulation techniques and one of at least one encoder;

identifying a distinct second modem having at least two demodulation schemes, said at least two demodulation schemes comprising one of at least two demodulation techniques and one of at least one decoder, said at least two demodulation techniques corresponding to said at least two modulation techniques, said at least one decoder corresponding to said at least one encoder, such that said at least two demodulation schemes correspond to said at least two modulation schemes;

establishing a link between said first modem and said second modem;

transmitting a channel probe signal from said first modem to said second modem;

said second modem receiving said channel probe signal;

processing said received channel probe signal;

selecting one of said first modem said at least two modulation schemes using said processed channel probe signal;

said first modem modulating said data using said selected one of at least two modulation schemes;

said first modem transmitting said modulated data;

said second modem receiving said modulated data;

said second modem demodulating said data using said one of at least two demodulation schemes, said one of at least two demodulation schemes corresponding to said selected one of at least two modulation schemes;

said processing said received channel probe signal comprising:

determining time spreading characteristics of said channel probe signal;

determining frequency spreading characteristics of said channel probe signal;

generating a channel scattering function estimate using said processed received channel probe signal; and said generating said channel scattering function estimate further comprising:

accepting modem extrinsic data further comprising channel characteristic data, propagation model data, modem position estimates, and strategic information; and combining said modem extrinsic data and said time spreading and said frequency spreading characteristics of said channel probe signal to estimate said channel scattering function.

10. A method for communicating data through a channel using at least two modems, comprising:

identifying a first modem having at least two modulation schemes, said at least two modulation schemes comprising one of at least one modulation technique and one of at least two encoders;

identifying a distinct second modem having at least two demodulation schemes, said at least two demodulation schemes comprising one of at least one demodulation technique and one of at least two decoders, said at least one demodulation technique corresponding to said at least one modulation technique, said at least two decoders corresponding to said at least two encoders, such that said at least two demodulation schemes correspond to said at least two modulation schemes;

establishing a link between said first modem and said second modem;

transmitting a channel probe signal from said first modem to said second modem;

said second modem receiving said channel probe signal;

processing said received channel probe signal;

selecting one of said first modem said at least two modulation schemes using said processed channel probe signal;

said first modem modulating said data;

said first modem transmitting said modulated data from said first modem to said second modem;

said second modem receiving said modulated data;

said second modem demodulating said data using said one of at least two demodulation schemes, said one of at least two demodulation schemes corresponding to said selected one of at least two modulation schemes;

said processing said received channel probe signal further comprising:

determining multipath time spreading characteristics of said channel probe signal;

determining Doppler frequency spreading characteristics of said channel probe signal; and generating a channel scattering function using said processed received channel probe signal.

11. The method of claim 10 wherein selecting one of said first modem said at least two modulation schemes comprises:

accepting modem extrinsic data further comprising channel characteristic data, propagation model data, modem position estimates, and strategic information; and combining said channel scattering function estimate with said modem extrinsic data to select one of said at least two modulation schemes.

12. The method of claim 10 further comprising updating said channel scattering function estimate upon predetermined criteria.

13. The method of claim 12 wherein updating said channel scattering function estimate upon predetermined criteria further comprises:
- establishing said predetermined criteria;
- determining said predetermined criteria is satisfied;
- transmitting said channel probe signal from said first modem to said second modem;
- receiving said channel probe signal at said second modem;
- determining time spreading characteristics of said channel probe signal;
- determining frequency spreading characteristics of said channel probe signal;
- deriving an updated channel scattering function estimate using said time spreading and said frequency spreading characteristics of said channel probe signal;
- determining an updated one of at least two modulation schemes using said updated channel scattering function estimate; and
- modulating said data using said updated one of at least two modulation schemes.

14. The method of claim 10 further comprising:
- said first modem coding said modulated data to indicate said selected one of at least two modulation schemes; and
- said second modem decoding said modulated data to select said one of at least two demodulation schemes, said selected one of at least two demodulation schemes corresponding to said selected one of at least two modulation schemes.

15. The method of claim 10 further comprising:
- said second modem transmitting a distinct second channel probe signal to said first modem;
- said first modem receiving said distinct second channel probe signal; and
- processing said received distinct second channel probe signal.

16. The method of claim 15 wherein processing said received distinct second channel probe signal further comprises:
- determining time spreading characteristics of said received distinct second channel probe signal;
- determining frequency spreading characteristics of said received distinct second channel probe signal; and
- generating a channel scattering estimate between said second modem and said first modem using said time spreading and said frequency spreading characteristics of said received distinct second channel probe signal.

17. The method of claim 16 wherein generating said channel scattering function estimate between said second modem and said first modem further comprises:
- accepting modem extrinsic data further comprising channel characteristic data, propagation model data, modem position estimates, and strategic information; and
- combining said modem extrinsic data and said time spreading and said frequency spreading characteristics of said channel probe signal to estimate said channel scattering function.

18. A method for communicating data through a channel using at least two modems, comprising:
- identifying a first modem having at least two modulation schemes, said at least two modulation schemes comprising one of at least one modulation technique and one of at least two encoders;
- identifying a distinct second modem having at least two demodulation schemes, said at least two demodulation schemes comprising one of at least one demodulation technique and one of at least two decoders, said at least one demodulation technique corresponding to said at least one modulation technique, said at least two decoders corresponding to said at least two encoders, such that said at least two demodulation schemes correspond to said at least two modulation schemes;
- establishing a link between said first modem and said second modem;
- transmitting a channel probe signal from said first modem to said second modem;
- said second modem receiving said channel probe signal;
- processing said received channel probe signal;
- selecting one of said first modem said at least two modulation schemes using said processed channel probe signal;
- said first modem modulating said data;
- said first modem transmitting said modulated data from said first modem to said second modem;
- said second modem receiving said modulated data;
- said second modem demodulating said data using said one of at least two demodulation schemes, said one of at least two demodulation schemes corresponding to said selected one of at least two modulation schemes;
- said processing said received channel probe signal further comprising:
  - determining time spreading characteristics of said channel probe signal;
  - determining frequency spreading characteristics of said channel probe signal; and
  - generating a channel scattering function using said processed received channel probe signal;
- said generating said channel scattering function estimate comprising:
  - accepting modem extrinsic data further comprising channel characteristic data, propagation model data, modem position estimates, and strategic information; and
  - combining said modem extrinsic data and said time spreading and said frequency spreading characteristics of said channel probe signal to develop said channel scattering function estimate.

* * * * *